United States Patent [19]
Rice

[11] 3,866,977
[45] Feb. 18, 1975

[54] SUPPRESSION OF VIBRATION IN ROTATING DISCS

[75] Inventor: James E. Rice, Cuyahoga Falls, Ohio

[73] Assignee: The Goodyear Tire & Rubber Company, Akron, Ohio

[22] Filed: Jan. 28, 1974

[21] Appl. No.: 437,104

Related U.S. Application Data

[63] Continuation-in-part of Ser. No. 254,022, May 17, 1972, Pat. No. 3,794,384.

[52] U.S. Cl. ............... 301/5 R, 181/33 P, 74/574, 301/64 SD
[51] Int. Cl. ...................... B60b 3/04, B60b 19/00
[58] Field of Search ............ 301/5 R, 8, 63 R, 63 D, 301/63 C, 64 SD, 64 R, 65, 66, 6 WB; 74/574; 29/159.01, 159.02, 159.03; 188/1 B; 181/33 P, 33 A

[56] References Cited
UNITED STATES PATENTS

| | | | |
|---|---|---|---|
| 3,062,072 | 11/1962 | Hirst | 74/574 |
| 3,293,939 | 12/1966 | Brown | 74/574 |
| 3,428,365 | 2/1969 | French | 301/65 |

FOREIGN PATENTS OR APPLICATIONS

| | | | |
|---|---|---|---|
| 1,253,402 | 6/1959 | Germany | 181/33 P |

Primary Examiner—M. Henson Wood, Jr.
Assistant Examiner—Reinhard J. Eisenzopf
Attorney, Agent, or Firm—F. W. Brunner; R. S. Washburn

[57] ABSTRACT

A disc or like body for rotation about an axis has a plurality of vibration prevention beams fixed thereon in diametrally opposed pairs extending radially inward of the peripheral edge of the disc and spaced at angular intervals about the rotation axis which are not equal to each other.

11 Claims, 15 Drawing Figures

SUPPRESSION OF VIBRATION IN ROTATING DISCS

This application is a continuation-in-part of my prior copending application Ser. No. 254,022, filed May 17, 1972, now U.S. Pat. No. 3,794,384.

The foregoing abstract is not to be taken as limiting the invention of this application, and in order to understand the full nature and extent of the technical disclosure of this application, reference must be made to the accompanying drawing and the following detailed description.

The invention relates to structure for and to methods of preventing vibration in rotating machinery and particularly for preventing significant vibration in directions generally parallel to the rotation axes of wheels, rotors, and other disc-like elements.

Heretofore, the problems of vibration in machine parts have been alleviated in some cases by general overall stiffening of the structure and in other cases by providing for damping or attenuation of the vibratory energy. Common in the latter cases is the connecting to the vibrating member of a material or device in which energy of vibration is damped by being converted to heat of friction or fluid flow. The present invention, on the contrary, is directed to the prevention or at least to the suppression of the vibration in the rotating body or disc itself where and when it originates. In application, the present invention does not rely on vibration damping or vibration absorbing devices, although such devices can be used in the structure associated with the discs or wheels embodying the invention.

It is, therefore, an object of the present invention to provide methods of and structure for preventing vibration of a disc in response to forces which may be applied to such discs.

In the description which follows, certain preferred embodiments of the invention are illustrated by way of example in the attached drawings in which.

The term "disc," as used in the present specification and claims, will be understood to mean bodies which rotate about axes of revolution such as, for example, vehicle wheels, pulleys, rotors, fly wheels, and gears, in which the diameter of the body exceeds the axial length or thickness of the body. The disc or body in accordance with the invention can extend diametrally in a plane normal to the axis or in a conical form such as that of a bell or cymbal. Any such body within the scope of the invention characteristically is subject to vibrations referred to as "plate mode vibrations" wherein, for example, in alternate radical sectors defined by two or more diametral lines in the disc, portions of the disc or plate are cyclically displaced in opposite axial directions. The so vibrating portions of the disc sectors are known as "anti-nodes" while the diametral lines therebetween, having essentially zero displacements are called "nodes." Such plate modes are referred to also as two-, or three-, or four-diameter modes. A further type of plate mode vibration is referred to as a bell or cymbal mode in which two or more annular portions of the disc form axially oscillating anti-nodes separated by a node or nodes of essentially zero oscillation formed circularly concentric with the axis of the disc.

Figure 1A:
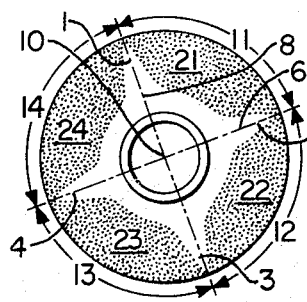
FIGS. 1a–1e illustrate schematically certain modes of vibration which occur in discs and which vibration modes are prevented or at least substantially suppressed in accordance with the invention.

Referring to the drawings and particularly to FIGS. 1a through 1e; FIG. 1a illustrates a disc vibrating in a plate mode referred to as a two-diameter plate mode. It will be observed that four nodes 1, 2, 3, and 4, having essentially no axially directed motion, which is to say motion normal to the plane of the figure, define two diameters 6, 8 crossing at the axis 10 at right angles to each other. The four sectors, 11, 12, 13, and 14 located between the diameters, or nodes, form or at least contain the vibrating anti-nodes 21, 22, 23, and 24, represented by the stippled areas. The anti-nodes 21, 23 at one instant are moving toward the viewer while the anti-nodes 22, 24 are, simultaneously, moving away from the viewer at the resonant frequency. This type of vibration is referred to as a two-diameter mode because the diameters 6, 8 containing the nodes or radii of substantially zero displacement are disposed at right angles to each other and define therebetween sectors each subtending 90°. Such cyclic oscillations of portions of the disc give rise not only to sound or noise which can become extremely objectionable but may also give rise to stresses destructive to the disc and consequent failure of the apparatus in which the disc is a part. Such cyclic oscillations or vibrations can also communicate variations in force to other parts of the apparatus or to the work piece in the apparatus with harmful results.

Figure 1B:
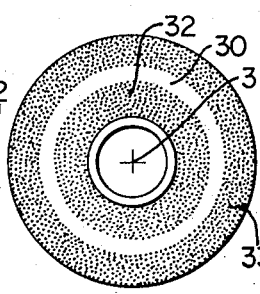

In FIG. 1b, the vibration mode or pattern illustrated is referred to as bell or cymbal mode. In this mode, the node or portion of the plate which is essentially free from displacement forms a circular ring 30 concentric about the axis 31 of the disc. The annular inner portion 32 forms an anti-node of the vibration pattern which is, for example, displaced away from the viewer while simultaneously the outer annular portion 33 is displaced toward the viewer. The respective movements of the anti-nodes back and forth in directions generally parallel to the rotation axis occur in a known manner at the or one of the natural frequencies of the disc. Cyclic forces applied to the disc, when occurring within the range of such natural frequencies or multiples thereof excite vibrations in the disc in a mode or pattern corresponding to the frequency of the vibration exciting forces applied to the disc.

Figure 1C:
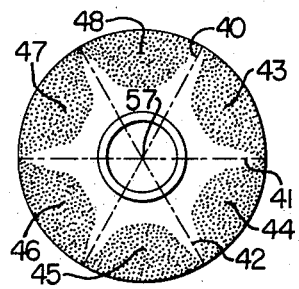
Figure 1D:
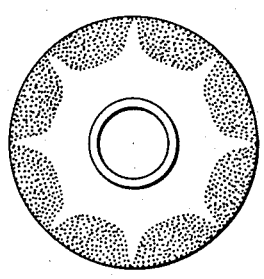
Figure 1E:
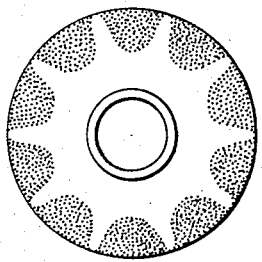

The discs illustrated in FIGS. 1c, 1d, and 1e illustrate plate mode patterns which occur at higher frequencies. In FIG. 1c, for example, is illustrated a three-diameter mode having nodes disposed along the diameters 40, 41, and 42, while the vibrating anti-nodes 43, 44, 45, 46, 47, and 48 occur in the sectors defined by the nodal diameters spaced equally about the axis 57. The anti-nodes 43, 45, 47 oscillate at one instant away from the viewer as the anti-nodes 44, 46, 48 simultaneously move oppositely toward the viewer parallel to the axis in response to higher frequencies of the variations in force applied to the disc. A four-diameter mode is illustrated in FIG. 1d, while a five-diameter mode is illustrated in FIG. 1e.

In accordance with the present invention, I have found that all of these modes of vibration can be substantially suppressed and even prevented by supporting the disc with a plurality of vibration suppressing members fixed on a rotating disc which otherwise would be subject to the vibrations described. Such vibration suppressing members extend inwardly of the circumference of the disc such that the members are disposed unequally angularly about the axis of rotation. Preferably, each vibration suppressing member is provided by a beam significantly stiffer than the stiffness of the disc. Each beam must be stiff enough substantially to compel the formation of an artificial node which, due to its unequal angular spacing from a next such beam, cannot be coincident with any real node. Moreover, the unequally spaced beams, as vibration suppressing members strongly suppress or prevent the excursion or axial movement of anti-nodes which in the absence of such members would occur in uniformly angular spaced intervals, that is, in axisymmetrical patterns or modes. The members or beams are so located angularly about the axis that the artificial node caused by the beam prevents the formation of the otherwise always axisymmetric modes or patterns and so functions to prevent or at least very substantially suppress any displacement of the disc in the direction of the axis in response to the forcing frequency. Thus, the natural frequency of the disc is raised and can be raised higher than any forcing frequency likely to be encountered in service by the disc. It should be noted that the unequal angular spacing between the pairs of members interrupts or even cancels the wave pattern of node - anti-node around the disc axis as well as radially of the disc axis (as in FIG. 1b) and prevents oscillation in one anti-node from being transmitted to a next adjacent anti-node position so that a condition of resonance cannot occur.

It is conventional to provide a disc fixed coaxially on a hub. To prevent or inhibit the vibration discussed above, the invention contemplates further securing the radially inward end of each of said members rigidly to and along an axial length of such hub. Each beam thereby forms a cantilever fixedly supported on the hub and attached securely to the disc to extend inwardly of the disc periphery.

It will be observed further that the beams, for normal considerations of rotational balance, will be disposed in opposing pairs so that the center of mass of each of the beams of a pair are located in a common plane containing the axis of the rotor and at radially equal distances from such axis. At least two pairs of beams so located form therebetween two angles which must be unequal. The two diametrally opposed pairs of beams must not be located on diameters at right angles to each other. In using three or more pairs of beams, the angle of each sector formed differs by at least about 5° from the angles of both of the adjacent sectors.

It is likewise conventional to provide a disc with a rim of axial thickness greater than the thickness of the disc in the axial direction. In such disc, pursuant to the present invention, it is particularly advantageous to secure the radially outer end of each vibration suppressing member or beam to and along an axial length of said rim as well as to and along an axial length of hub in the manner illustrated in FIG. 2.

It is contemplated within the scope of the present invention that the disc and the vibration suppression members be formed integrally as by forging, casting, as a weldment, or by any suitable equivalent, and that such disc can include or omit the hub and/or the rim. The material of which such disc is made can be metal, or other conventionally used materials.

Figure 2:
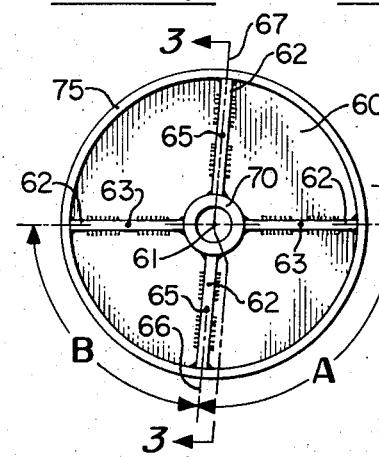
FIGS. 2 and 3 illustrate an embodiment of the invention.
Figure 3:
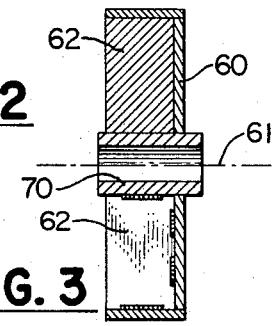
Figure 4:
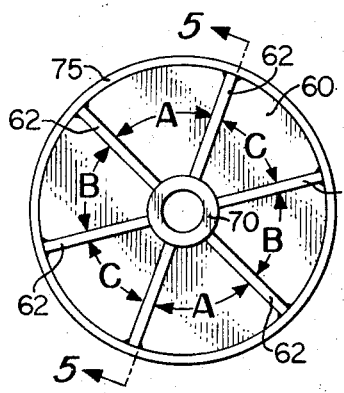
FIGS. 4–11 illustrate further embodiments of the invention.

Referring again to the drawings and particularly to FIGS. 2 and 3, a preferred embodiment of the invention comprises a disc 60 arranged for rotation coaxially about an axis 61, which disc has secured thereto a plurality of vibration suppressing members each of which is provided by a stiff beam 62, the stiffness of which is materially greater than the stiffness of the disc itself. The members or beams 62 are disposed in pairs such that the respective centers of mass 63 of opposing members are in a plane 64 containing the axis and equally distant from the axis. The vibration suppressing member or beams 62 of a second pair are likewise disposed so that their centers of mass 65 lie in a second plane 66 containing the axis which plane is disposed to form with the first such plane two unequal angles A and B. Additional beams may be disposed similarly in opposing balanced pairs, as illustrated by FIG. 4 in which the angle A is greater than angle B which is greater than angle C, each by about 10°. The respective angles between the plane containing one pair and the plane containing a next adjacent pair must never be equal.

Figure 5:
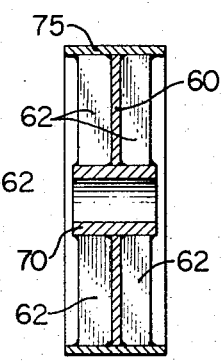
Figure 6:
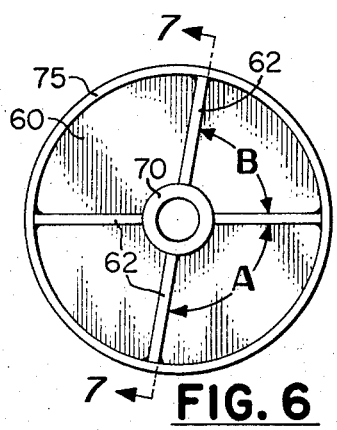
Figure 7:
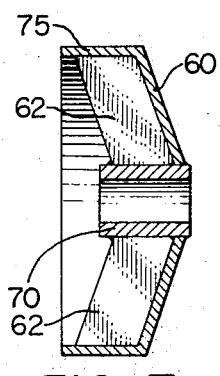
Figure 8:
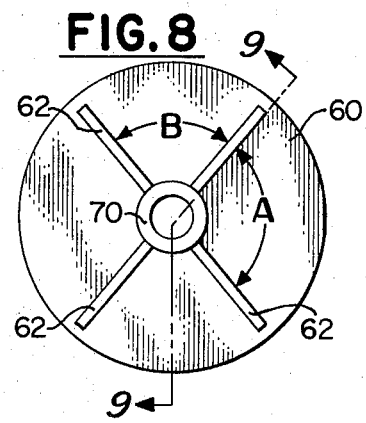

FIGS. 2 through 11 illustrate structures embodying the invention no one of which can be said at all times to be preferred but can be selected as preferred depending on the particular service for which the disc is intended. It will be noted that in each figure, the article includes a central disc 60. It is common practice to fix such disc coaxially upon a central hub 70. It is also common practice for a disc to have a rim 75, usually integrally attached, having greater axial length than the thickness or axial width of the disc. Such rim may be disposed symmetrically with respect to the disc as in FIG. 5 or axially offset as in FIG. 3. The same is true with respect to the relation of the hub and disc. FIGS. 6 and 7 illustrate a construction in which the disc 70 is not in a plane perpendicular to the axis but rather is in the form of a cone having an axis common to the axis of the hub and rim.

Figure 9:
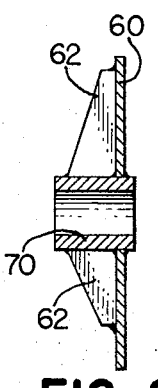

The vibration suppressing beams 62 may be applied to one side only of the disc as is illustrated in FIGS. 3, 7, and 9, or may be applied at opposite sides of the disc as in FIG. 5. In all cases, such vibration suppressing beams are securely attached to the disc. In FIGS. 2-11, each beam 62 is rigidly fixed at each of its radially inner ends along an axial length of the exterior surface of the hub, and in FIGS. 2–7, at the radially outer end thereof, each beam is similarly rigidly attached along an axial length of the inner circumference of the rim. As previously mentioned, the beams are disposed on the disc in a balanced relation in opposing pairs each of which beams will extend inwardly from the periphery of the disc parallel, or approximately so, to the respective diameter containing their centers of mass, so that the disc and beams are suitably balanced for rotation.

Preferably, the disc itself is free of holes and other openings of the sort commonly used to reduce the weight of the disc. If such holes must be provided, it is preferred that they be sufficiently small as not to change characteristic nodal patterns.

FIGS. 2 and 3 represent the preferred structure illustrated in the parent application, now Ser. No. 254,022, now U.S. Pat. No. 3,794,384.

Figure 10:
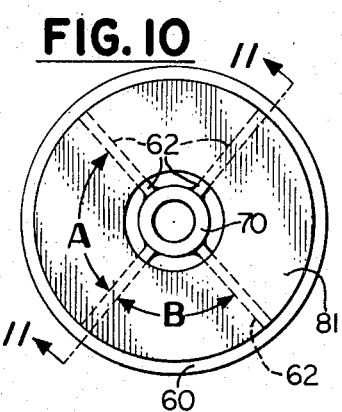
Figure 11:
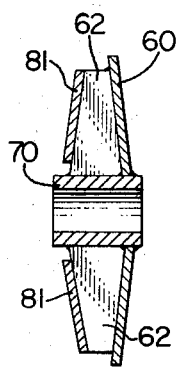

Referring to FIGS. 10, 11, a further embodiment of the invention optionally can have a second disc 81 mounted coaxially with the first disc 60 and spaced axially outwardly therefrom. The second disc or shroud plate 81, fixed rigidly on the vibration suppressing members 62, can be added for other reasons, for example, for esthetic reasons. As in the first disc 60, vibrations in the plate modes are prevented in the second disc by the presence and unequal angular spacing of the vibration suppressing members in the manner which has been described.

While certain representative embodiments and details have been shown for the purpose of illustrating the invention, it will be apparent to those skilled in the art that various changes and modifications may be made therein without departing from the spirit or scope of the invention.

What is claimed is:

1. The method of suppressing plate mode structural vibration of a disc rotating about an axis comprising supporting said disc by a plurality of pairs of vibration suppressing members fixed on said disc and extending inwardly of the circumference thereof, each respective member of each said pair thereof being disposed in diametrally balancing relation with the other member of such pair, and spacing said pairs of members at unequal angular intervals such that any interval differs from the next interval by at least 5°.

2. The method as claimed in claim 1, wherein said disc is fixed coaxially on a hub having an axial length greater than the thickness of the disc rotation therewith about said axis including the step of securing the radially inward end of each said member rigidly to and along an axial length of said hub.

3. The method as claimed in claim 1, wherein said disc is fixed coaxially to a rim of axial thickness greater than the disc, and including the step of securing the radially outer ends of said members to and along an axial length of said rim.

4. A disc arranged for rotation coaxially about an axis and a plurality of pairs of vibration suppressing members fixedly attached to said disc in diametrally balanced array, each member extending radially inwardly of the periphery of the disc, each said pair of members defining with an other of said pairs at least two unequal angular spaces therebetween.

5. A disc as claimed in claim 4, wherein each of said members comprises a beam of greater stiffness than said disc.

6. A disc as claimed in claim 4, wherein said members are formed integrally with said disc.

7. A disc as claimed in claim 4, wherein said disc is provided with a single central coaxial opening and is free of other openings therethrough.

8. A disc as claimed in claim 4, wherein said disc has integrally secured thereto a central coaxial hub of axial length greater than the thickness of said disc, the radially inward end of each of said members being secured rigidly to and along an axial length of said hub.

9. A disc as claimed in claim 4, wherein said disc has integrally secured thereon a peripheral rim of axial thickness greater than the disc, the radially outward end of each of said members being secured rigidly to and along an axial length of said rim.

10. A disc as claimed in claim 4, a second disc coaxial with the first said disc spaced axially therefrom, such second disc being affixed rigidly to each of said members.

11. A disc as claimed in claim 4, wherein the radial angle between a first pair of said members differs from the radial angle between the next circumferentially adjacent pairs by at least 5°.

* * * * *